US011942729B2

(12) United States Patent
Yamada et al.

(10) Patent No.: US 11,942,729 B2
(45) Date of Patent: Mar. 26, 2024

(54) SHIELD CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yusuke Yamada, Mie (JP); Junichi Mukuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 311 days.

(21) Appl. No.: 17/614,005

(22) PCT Filed: May 28, 2020

(86) PCT No.: PCT/JP2020/021028
§ 371 (c)(1),
(2) Date: Nov. 24, 2021

(87) PCT Pub. No.: WO2020/246352
PCT Pub. Date: Dec. 10, 2020

(65) Prior Publication Data

US 2022/0224059 A1 Jul. 14, 2022

(30) Foreign Application Priority Data

Jun. 6, 2019 (JP) ................................ 2019-106451

(51) Int. Cl.
*H01R 13/658* (2011.01)
*H01R 13/516* (2006.01)
(Continued)

(52) U.S. Cl.
CPC ....... *H01R 13/6582* (2013.01); *H01R 13/516* (2013.01); *H01R 13/533* (2013.01); *H01R 2201/26* (2013.01)

(58) Field of Classification Search
CPC .............. H01R 13/6582; H01R 13/516; H01R 13/533; H01R 2201/26
(Continued)

(56) References Cited

U.S. PATENT DOCUMENTS 5,541,448 A * 7/1996 Carpenter ........ G06K 19/07735 257/679
5,785,557 A * 7/1998 Davis ..................... H01R 13/26 439/108
(Continued)

FOREIGN PATENT DOCUMENTS

JP 2015-082464 A 4/2015
JP 2015-122250 A 7/2015
(Continued)

OTHER PUBLICATIONS

International Search Report dated Aug. 11, 2020 for WO 2020/246352 A1 (5 pages).

*Primary Examiner* — Alexander Gilman
(74) *Attorney, Agent, or Firm* — Venjuris, P.C.

(57) ABSTRACT

It is aimed to provide a shielded connector capable of improving heat dissipation performance while suppressing enlargement. A shielded connector 10 includes a housing 11, a shield shell 12 for covering the housing 11 from outside, a connection terminal 14 to be accommodated into the housing 11 and electrically connected to a mating device, and an inner conductive member 13 for electrically connecting the connection terminal 14 and a wire W. High radiation portions 51 having at least a higher radiation rate than a core W1 of the wire W are provided on at least some of a surface 11*a* of the housing 11, a surface 12*a* of the shield shell 12,
(Continued)

a surface 14*a* of the connection terminal 14 and a surface 13*a* of the inner conductive member 13.

3 Claims, 5 Drawing Sheets

(51) Int. Cl.
*H01R 13/533* (2006.01)
*H01R 13/6582* (2011.01)

(58) Field of Classification Search
USPC .......................................................... 439/607
See application file for complete search history.

(56) References Cited

U.S. PATENT DOCUMENTS

| | | | | |
|---|---|---|---|---|
| 7,128,582 | B2 * | 10/2006 | Fang | H01R 13/518 439/79 |
| 8,662,920 | B2 * | 3/2014 | Ishibashi | H01R 13/6215 439/573 |
| 10,270,205 | B2 * | 4/2019 | Nishio | H01R 13/62938 |
| 10,431,925 | B2 * | 10/2019 | Yuki | B60K 6/40 |
| 10,476,209 | B2 * | 11/2019 | Kitagawa | H01R 13/639 |
| 10,971,844 | B2 * | 4/2021 | Hirakawa | H01R 13/5208 |
| 2002/0155756 | A1 * | 10/2002 | Yoshioka | H01R 13/648 439/607.01 |
| 2006/0185878 | A1 * | 8/2006 | Soffer | H02G 3/121 174/50 |
| 2007/0117458 | A1 * | 5/2007 | Winker | G02B 6/4201 439/607.01 |
| 2008/0124958 | A1 * | 5/2008 | Cheng | H01R 13/6582 439/155 |
| 2011/0053408 | A1 * | 3/2011 | Tsuruta | H01R 13/621 439/362 |
| 2012/0156916 | A1 * | 6/2012 | Suzuki | B60L 50/51 439/345 |
| 2012/0184149 | A1 * | 7/2012 | Suzuki | H01R 24/28 439/660 |
| 2012/0184152 | A1 * | 7/2012 | Kataoka | H01R 24/28 439/660 |
| 2014/0030921 | A1 * | 1/2014 | Kobayashi | H01R 13/748 439/607.01 |
| 2014/0120763 | A1 * | 5/2014 | Itsuki | H01R 13/533 439/382 |
| 2014/0120769 | A1 * | 5/2014 | Dang | H01R 13/6586 439/607.05 |
| 2014/0127939 | A1 * | 5/2014 | Ishibashi | H01R 13/6397 439/573 |
| 2014/0153192 | A1 * | 6/2014 | Neer | H05K 9/0058 361/704 |
| 2015/0229067 | A1 * | 8/2015 | Nakai | H01R 13/405 439/587 |
| 2016/0294110 | A1 * | 10/2016 | Motohashi | H01R 13/6581 |
| 2016/0329645 | A1 * | 11/2016 | Tsai | H01R 13/6595 |
| 2017/0229808 | A1 * | 8/2017 | Mukuno | H01R 13/58 |
| 2017/0256893 | A1 * | 9/2017 | Kato | H01R 13/73 |
| 2018/0277986 | A1 * | 9/2018 | Eckel | H05K 7/2039 |
| 2019/0006802 | A1 * | 1/2019 | Ju | H05K 7/2039 |
| 2019/0020145 | A1 * | 1/2019 | Ju | H01R 13/642 |
| 2019/0021185 | A1 * | 1/2019 | Ju | H01R 13/502 |
| 2019/0036270 | A1 * | 1/2019 | Aoshima | H01R 13/502 |
| 2019/0162603 | A1 * | 5/2019 | Lyon | B60L 53/14 |
| 2022/0069508 | A1 * | 3/2022 | Hashimoto | H02J 7/00 |
| 2022/0224059 | A1 * | 7/2022 | Yamada | H01R 13/533 |

FOREIGN PATENT DOCUMENTS

| | | | |
|---|---|---|---|
| JP | 2015-204402 | A | 11/2015 |
| JP | 2015-220030 | A | 12/2015 |
| JP | 2017-098418 | A | 6/2017 |
| JP | 2018-113119 | A | 7/2018 |
| WO | 2015/060113 | A1 | 4/2015 |

* cited by examiner

SHIELD CONNECTOR

CROSS REFERENCE TO RELATED APPLICATIONS

This application is a national phase of PCT application No. PCT/JP2020/021028, filed on 28 May 2020, which claims priority from Japanese patent application No. 2019-106451, filed on 6 Jun 2019, all of which are incorporated herein by reference.

TECHNICAL FIELD

The present invention relates to a shield connector.

BACKGROUND

Conventionally, a shield connector is known which includes a housing for holding a part of a wire inserted therein, a core of the wire being electrically connected to a terminal of a mating connector by connecting the housing to the mating connector (see, for example, Patent Document 1). In this shield connector, a part of the wire is inserted into the housing, and the core of the wire is electrically connected to an inner conductor and the terminal in the housing. The core is electrically connected to the terminal of the mating connector by the contact of the terminal of the shielded connector with the terminal in the mating connector.

PRIOR ART DOCUMENT

Patent Document

Patent Document 1: WO 2015/060113 A1

SUMMARY OF THE INVENTION

Problems to be Solved

In the shield connector described above, heat generated in the terminal and the inner conductor in the housing is mainly transferred to the wire. Further, since the housing for accommodating the terminal and the inner conductor is separated from the terminal and the inner conductor, the heat is unlikely to be transferred to the housing via an internal air layer. Thus, in a shield connector used in a hybrid vehicle, electric vehicle or the like, the amount of heat generation increases since a large current is supplied also to a connected device. Therefore, to improve heat dissipation performance, the enlargement of the terminal and the inner conductor and a larger diameter of the wire are necessary, and the enlargement of the shield connector itself is concerned about.

The present invention was developed to solve the above problem and aims to provide a shield connector capable of improving heat dissipation performance while suppressing enlargement.

Means to Solve the Problem

The present disclosure is directed to a shielded connector with a housing, a shield shell for covering the housing from outside, a terminal to be accommodated into the housing and electrically connected to a mating device, and an inner conductor for electrically connecting the terminal and a wire, wherein high radiation portions having at least a higher radiation rate than a core of the wire are provided on at least some of a surface of the housing, a surface of the shield shell, a surface of the terminal and a surface of the inner conductor.

Effect of the Invention

According to the shield connector of the present invention, it is possible to improve heat dissipation performance while suppressing enlargement.

DETAILED DESCRIPTION TO EXECUTE THE INVENTION

Description of Embodiments of Present Disclosure

First, embodiments of the present disclosure are listed and described.

[1] The shield connector of the present disclosure includes a housing, a shield shell for covering the housing from outside, a terminal to be accommodated into the housing and electrically connected to a mating device, and an inner conductor for electrically connecting the terminal and a wire, wherein high radiation portions having at least a higher radiation rate than a core of the wire are provided on at least some of a surface of the housing, a surface of the shield shell, a surface of the terminal and a surface of the inner conductor.

According to the above mode, heat generated in the terminal and the inner conductor in association with energization can be actively dissipated from the housing and the shield shell by including the high radiation portions having a higher radiation rate than the core of the wire. Thus, heat dissipation can be improved without enlargement.

[2] Preferably, the shield shell includes a low radiation portion having a lower radiation rate than the high radiation portions on at least a part of an outer surface of the shield shell.

According to this mode, since the low radiation portion having a lower radiation rate than the high radiation portions is provided on at least the part of the outer surface of the shield shell, the influence of heat by a heat source can be suppressed in the low radiation portion, for example, if the heat source is present outside.

[3] Preferably, the low radiation portion is provided at a position facing an external heat source on the outer surface of the shield shell.

According to this mode, the influence of heat by the external heat source can be suppressed by providing the low radiation portion at the position facing the external heat source on the outer surface of the shield shell.

Details of Embodiment of Present Disclosure

Hereinafter, a specific example of a shield connector is described with reference to the drawings. Note that the present invention is not limited to these illustrations and is intended to be represented by claims and include all changes in the scope of claims and in the meaning and scope of equivalents. Further, in figures, a part of a configuration may be shown in an exaggerated or simplified manner for the convenience of description.

Figure 1:
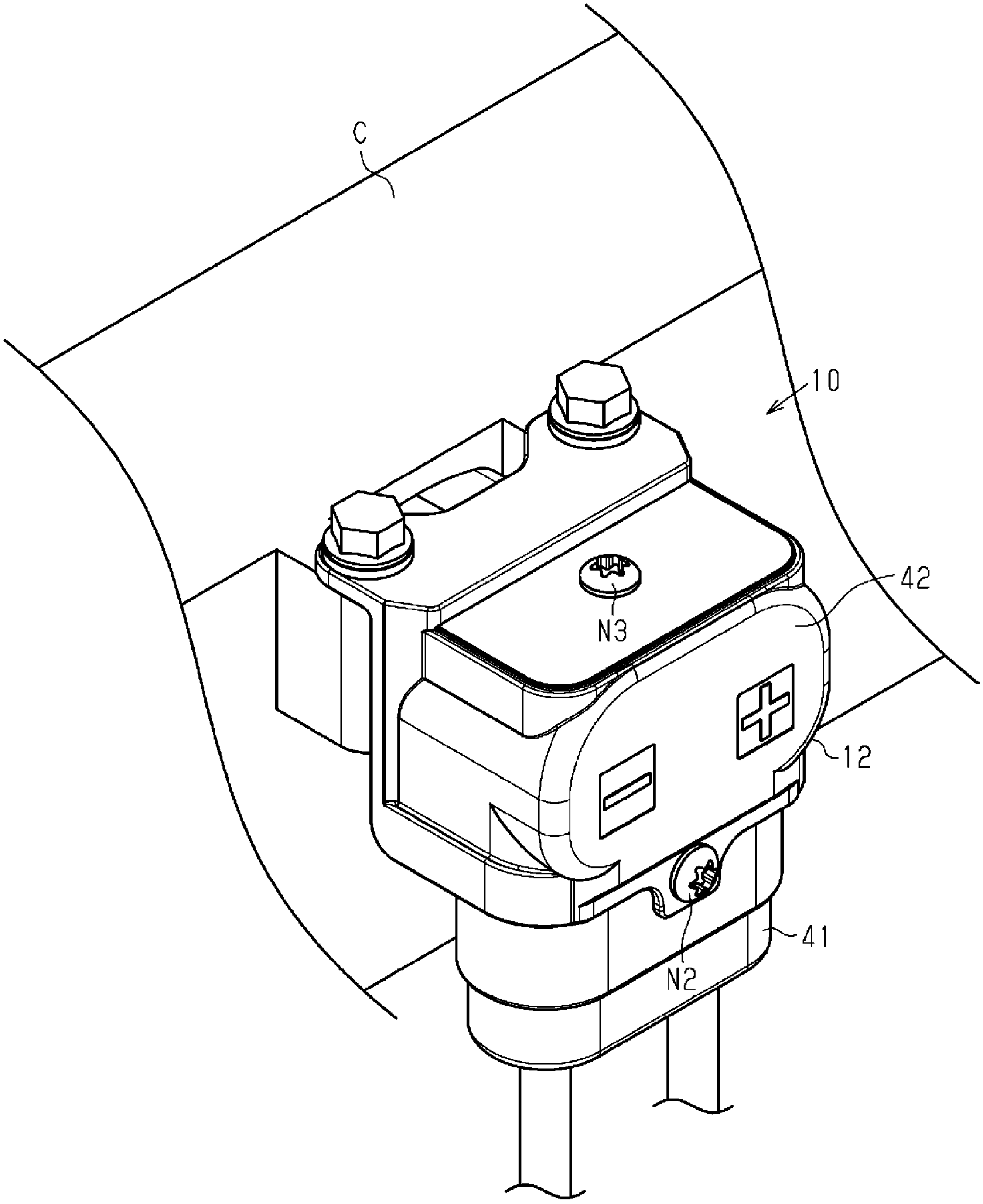
FIG. 1 is a perspective view showing a state where a shield connector in one embodiment is mounted on a case of a device.
Figure 2:
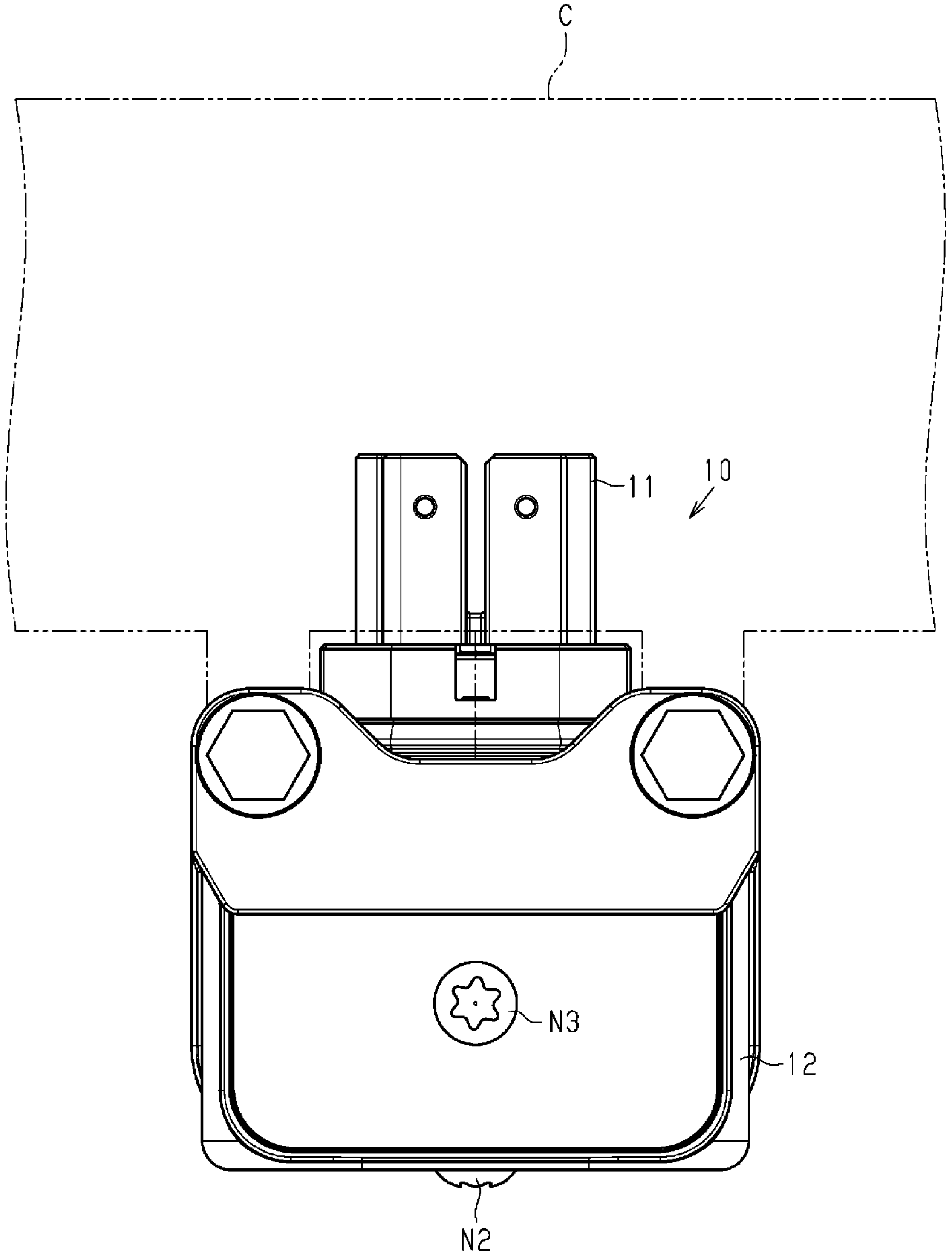
FIG. 2 is a plan view of the shield connector in the embodiment.
Figure 3:
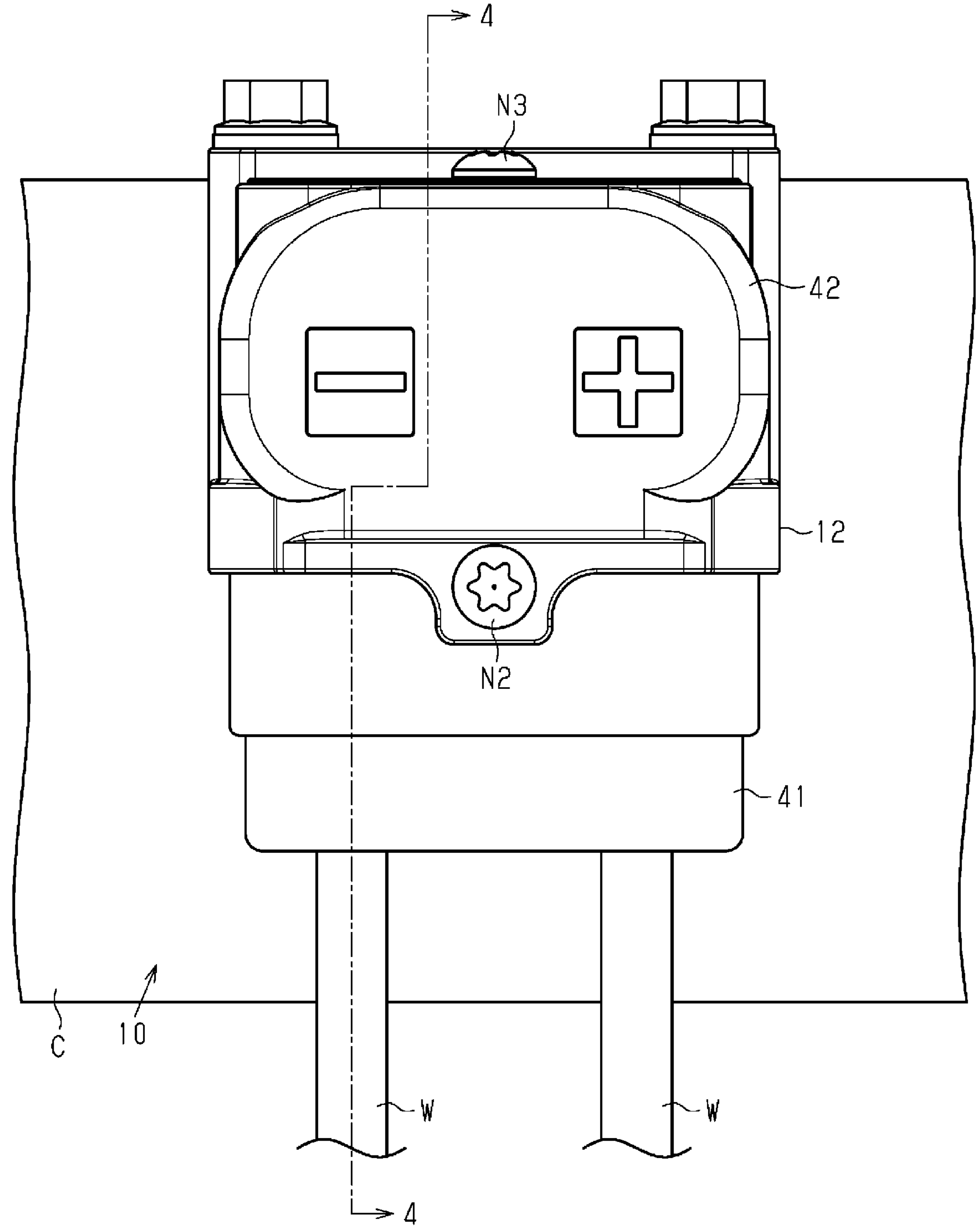
FIG. 3 is a front view of the shield connector in the embodiment.

As shown in FIGS. 1 to 3, a shield connector 10 of this embodiment is, for example, mounted on a case C of a device such as an inverter or motor of a hybrid vehicle, electric vehicle or the like. An unillustrated device-side connector is disposed inside the case C. The shield connector 10 is connectable to the device-side connector. Note that, in the following description, a vertical direction is based on a vertical direction of FIG. 4. Further, a front-rear direction is based on a lateral direction of FIG. 4, wherein a leftward direction (connecting direction to the device-side connector) in FIG. 4 is referred to as a forward direction and a rightward direction (separating direction from the device-side connector) in FIG. 4 is referred to as a rearward direction.

As shown in FIGS. 1 to 4, the shield connector 10 includes housings 11 made of synthetic resin, a shield shell 12 for covering the housings 11, inner conductive members 13 provided inside the housings 11, and connection terminals 14 for electrically connecting the inner conductive members 13 and terminals of the mating connector.

The housing 11 is, for example, made of synthetic resin and substantially L-shaped as a whole. One end of the housing 11 projects forward, and the other end projects downward. The device-side connector is connected to a front end part of the housing 11, and an end of a wire W is introduced into a lower end part of the housing 11. In other words, the wire W is pulled out from the bottom of the housing 11.

Figure 4:
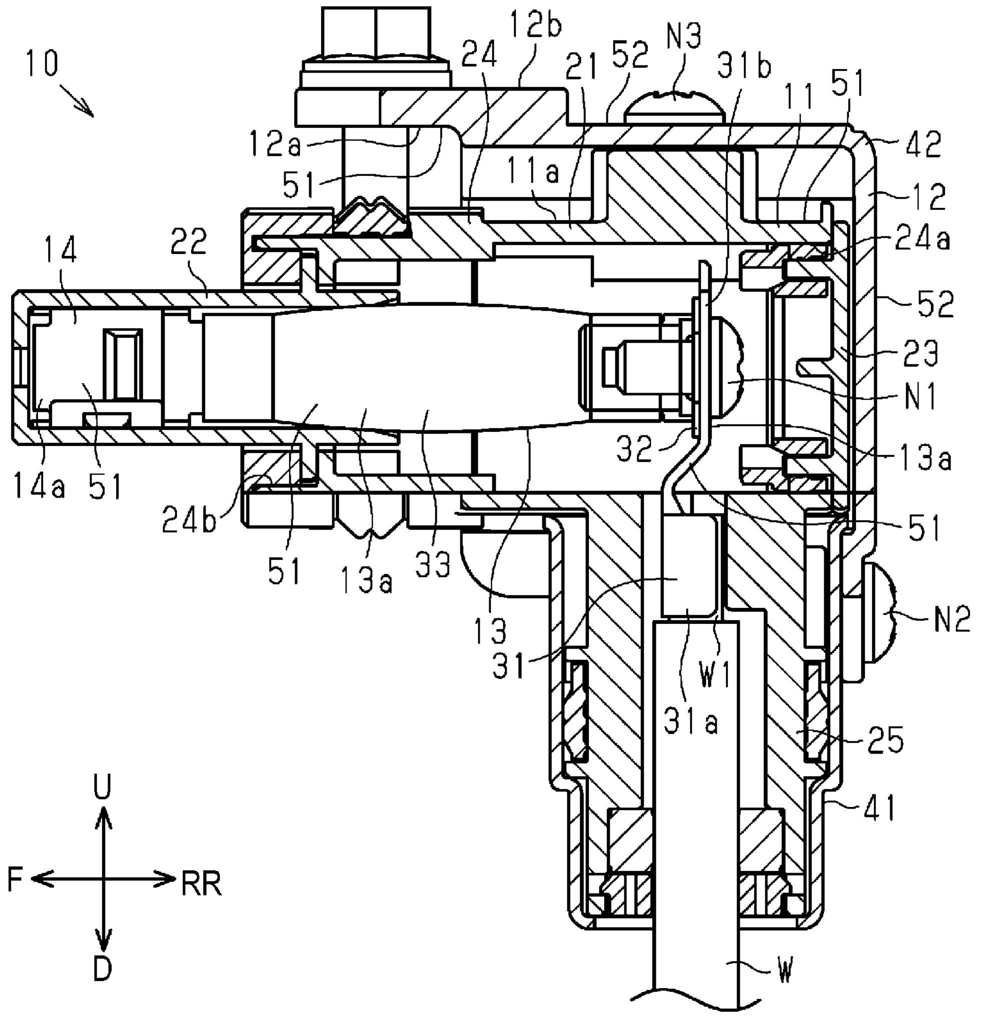
FIG. 4 is a section along 4-4 in FIG. 3.

As shown in FIG. 4, the housing 11 includes a rear member 21, a front member 22 and a cover member 23.

The rear member 21 includes a first tube portion 24 extending in the front-rear direction and a second tube portion 25 extending downward from a rear side of the first tube portion 24, and is substantially L-shaped.

The first tube portion 24 includes openings 24*a*, 24*b* in both ends in the front-rear direction. The cover member 23 is detachably provided in the opening 24*a* on a rear side of the first tube portion 24. The front member 22 is mounted in the opening 24*b* on a front side of the first tube portion 24.

The front member 22 is, for example, formed into a tubular shape.

The inner conductive member 13 includes a first conductive member 31 to be connected to a core W1 of the wire W, a second conductive member 32 to be connected to the first conductive member 31 and a third conductive member 33 for connecting the second conductive member 32 and the connection terminal 14.

The first conductive member 31 includes a barrel portion 31*a* to be connected to the core W1 of the wire W and a terminal portion 31*b* through which a fixing screw N1 is inserted. The first conductive member 31 of this embodiment is configured by arranging the barrel portion 31*a* and the terminal portion 31*b* in the vertical direction. The barrel portion 31*a* of the first conductive member 31 and the core W1 of the wire W are accommodated in the second tube portion 25. Further, the terminal portion 31*b* of the first conductive member 31 is accommodated in the first tube portion 24. Note that the core W1 of the wire W and the barrel portion 31*a* are possibly connected, for example, by crimping or welding. However, without limitation to this, a known connection method may be used for connection.

The second conductive member 32 is connected to an upper end part of the first conductive member 31 extending in the vertical direction and connected to a rear end part of the third conductive member 33 extending in the front-rear direction. That is, the second conductive member 32 is for relaying the first and third conductive members 31, 33, extending directions of which are orthogonal, and a substantially L-shaped conductive member can be, for example, adopted as such. The second conductive member 32 of this embodiment is fastened to the terminal portion 31*b* of the first conductive member 31 by the fixing screw N1. Here, by removing the cover member 23 from the rear opening 24*a* of the first tube portion 24 described above, a fastening operation by the fixing screw N1 is possible, using the opening 24*a*.

The third conductive member 33 is a flexible conductive member. A braided wire can be adopted as an example of the third conductive member 33, but there is no limitation to this. The third conductive member 33 is roughly provided in front of and near the first tube portion 24 of the rear member 21 of the housing 11.

The connection terminal 14 is a conductive member to be attached to the front end of the third conductive member 33. The connection terminal 14 is, for example, configured such that a rectangular tube portion internally including a resilient contact piece for resiliently contacting a standby terminal of the device and a barrel portion to be connected to the third conductive member 33 by crimping or welding are arranged in the front-rear direction. The connection terminal 14 is accommodated in an accommodation space in the front member 22 of the housing 11.

As shown in FIG. 4, the housing 11 of this embodiment is covered by the shield shell 12 made of conductive metal.

As shown in FIGS. 1, 3 and 4, the shield shell 12 is configured by assembling a lower member 41 and an upper member 42 with each other. The lower member 41 is formed by press-working a metal plate material of aluminum, aluminum alloy or the like, and the upper member 42 is made of metal such as aluminum or aluminum alloy and formed by die casting. The lower member 41 and the upper member 42 are fixed to the housing 11 by being fastened together by a fixing screw N2. The upper member 42 is fixed to the housing 11 by a fixing screw N3.

The shield connector 10 of this embodiment includes high radiation portions 51 on a surface 14*a* of the connection terminal 14, a surface 13*a* of the inner conductive member 13, a surface 11*a* of the housing 11 and an inner surface 12*a* of the shield shell 12.

The high radiation portion 51 has, for example, a higher radiation rate than the core W1 (copper) of the wire W. For example, the core W1 made of copper has a higher radiation rate, for example, by being oxidized. The radiation rate mentioned here means a radiation rate before oxidation. Further, the radiation rate of the high radiation portion 51 is preferably, for example, 0.7 or more. The entire high radiation portion 51 may have the same radiation rate or may have varying radiation rates.

A formation method by plating or painting can be, for example, adopted for the high radiation portion 51 of the connection terminal 14, the high radiation portion 51 of the inner conductive member 13 and the high radiation portion 51 of the shield shell 12. Further, the high radiation portion 51 of the housing 11 may be formed, for example, using a resin material colored in advance or may be formed on the surface 11*a* of the housing 11 by painting or the like.

Figure 5:
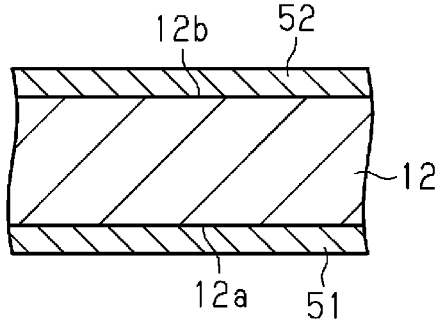
FIG. 5 is a diagram showing a high radiation portion of the shield connector in the embodiment.

As shown in FIG. 5, an outer surface 12*b* of the shield shell 12 includes a low radiation portion 52 entirely having a lower radiation rate than the high radiation portion 51. The low radiation portion 52 is, for example, the outer surface 12*b* of the shield shell 12 itself. That is, the radiation rate of the low radiation portion 52 is that of the outer surface 12*b* of the shield shell 12. The shield shell 12 is made of the conductive metal material (aluminum, aluminum alloy or the like as an example) as described above. The radiation rate in this case is, for example, 0.3 or less. The entire low radiation portion 52 may have the same radiation rate or may have varying radiation rates.

Functions of this embodiment are described.

In the shield connector 10 of this embodiment, the core W1 of the wire W is connected to the inner conductive member 13 and the inner conductive member 13 is connected to the connection terminal 14. The connection terminal 14 is, for example, connected to the terminal of the device-side connector of the mating device. In this way, a current can be supplied between the wire W (core W1) and the mating device.

Further, the high radiation portions 51 having a higher radiation rate than the core W1 of the wire W are provided on the surface 14*a* of the connection terminal 14, the surface 13*a* of the inner conductive member 13, the surface 11*a* of the housing 11 and the inner surface 12*a* of the shield shell 12. Here, in the shield connector 10, heat is generated, for example, in the inner conductive member 13 and the connection terminal 14 connecting the mating connector and the wire W in the case of supplying a current between the device-side connector and the wire W. Part of the heat generated in the inner conductive member 13 and the connection terminal 14 is transferred to the housing 11 having the high radiation portion 51 via an air layer. At least part of the heat transferred to the housing 11 is transferred to the shield shell 12 having the high radiation portion 51. The heat transferred to the shield shell 12 is dissipated to outside. At this time, since the outer surface 12*b* of the shield shell 12 has the low radiation portion 52, the transfer of the dissipated heat from the outer surface 12*b* of the shield shell 12 to the inside again is suppressed. Further, even if another heat source is located outside, the influence of heat by the external heat source can be suppressed since the outer surface 12*b* of the shield shell 12 has the low radiation portion 52.

Effects of this embodiment are described.

(1) Since heat generated in the connection terminal 14 and the inner conductive member 13 in association with energization can be actively dissipated from the housing 11 and the shield shell 12 by having the high radiation portions 51 having a higher radiation rate than the wire W1 of the wire W, heat dissipation can be improved without enlargement.

(2) The low radiation portion 52 having a lower radiation rate than the high radiation portions 51 is provided on at least a part of the outer surface 12*b* of the shield shell 12. Thus, for example, if a heat source is present outside, the influence of heat by the heat source can be suppressed in the low radiation portion 52. Particularly, in the shield connector for connecting the motor or inverter as in this embodiment, the motor or inverter itself tends to become an external heat source and the influence thereof is large. Therefore, a configuration for providing the low radiation portion 52 on the outer surface 12*b* of the shield shell 12 located on an outermost side can suitably suppress the influence of heat by the heat source.

Note that the above embodiment can be modified and carried out as follows. The above embodiment and the following modifications can be carried out in combination without technically contradicting each other.

Although the low radiation portion 52 is provided on the entire outer surface 12*b* of the shield shell 12 in the above embodiment, there is no limitation to this.

Figure 6:
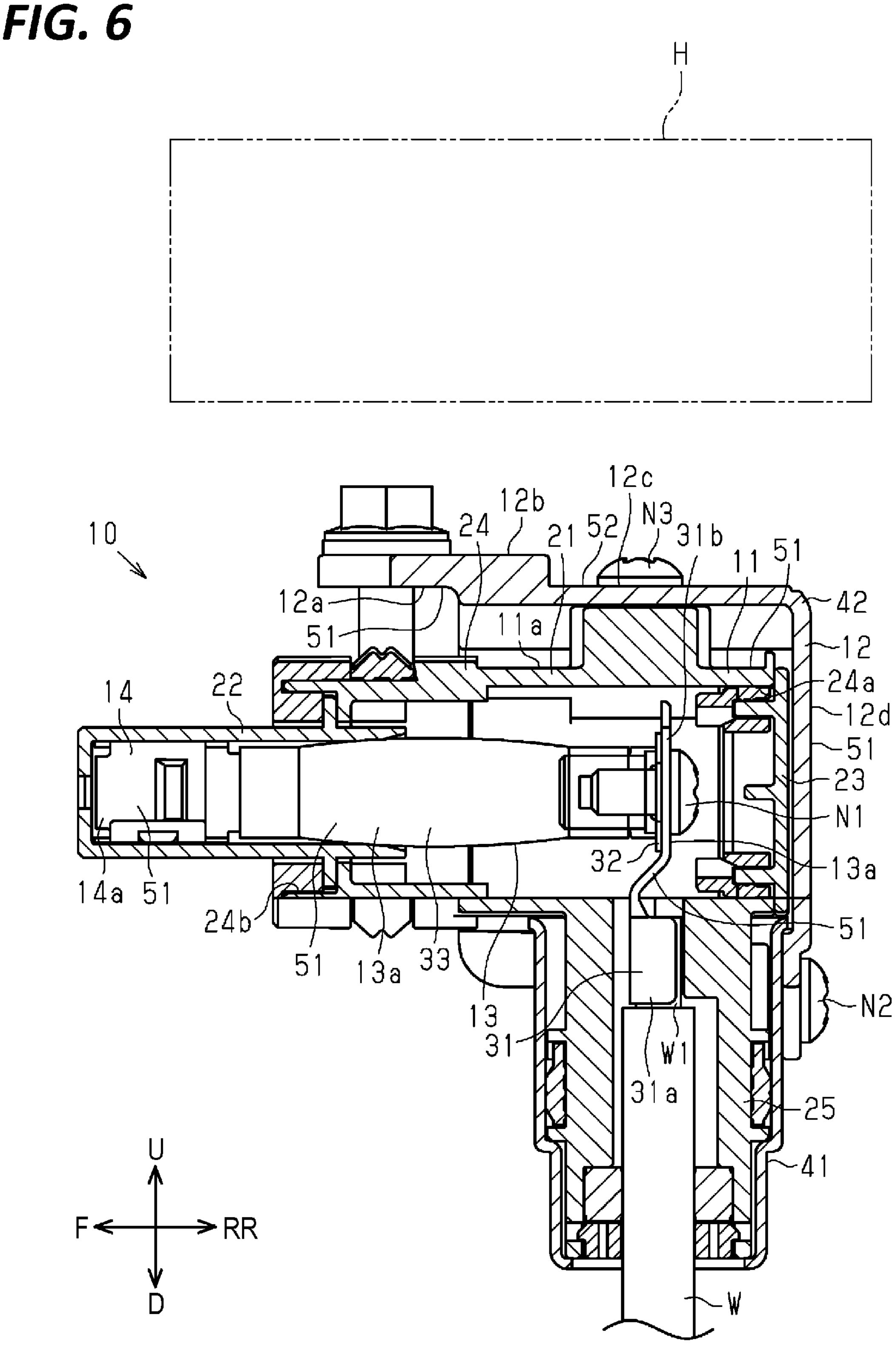
FIG. 6 is a section of a shield connector in a modification.

As shown in FIG. 6, the low radiation portion 52 may be provided on a part of the outer surface 12*b*. In this case, the high radiation portion 51 is provided on the remaining part of the outer surface 12*b*.

As shown in FIG. 6, the low radiation portion 52 may be provided in a part 12*c* facing an external heat source H on the outer surface 12*b*. By providing the low radiation portion 52 in the part 12*c* facing the external heat source H, the influence of heat by the external heat source H can be effectively suppressed. Particularly, since the shield connector 10 is often proximate to a vehicle drive source (motor) or inverter, the shield connector 10 is easily affected by heat of the heat source H and the provision of the low radiation portion as described above can suitably suppress the influence of heat by the heat source H. In a configuration shown in FIG. 6, the high radiation portion 51 may be provided in a part (e.g. rear surface 12*d*) not facing the external heat source H on the outer surface 12*b*.

Further, the high radiation portion 51 may be provided on the outer surface 12*b* of the shield shell 12 by omitting the low radiation portion 52. That is, the high radiation portions 51 may be provided on the inner surface 12*a* and the outer surface 12*b* of the shield shell 12.

Although the housing 11 is composed of the rear member 21, the front member 22 and the cover member 23 in the above embodiment, there is no limitation to this. For example, the rear member 21 and the front member 22 may be integrally formed in advance. Further, the housing 11 may be composed of two or less members or four or more members.

Although the shield shell 12 is composed of the lower member 41 and the upper member 42 in the above embodiment, there is no limitation to this. For example, a lower member and an upper member may be integrally formed in advance. The shield shell 12 may be composed of three or more members.

Although the lower member 41 and the upper member 42 are fastened together to configure the shield shell 12 in the above embodiment, a shield shell may be configured by separately fastening an upper member and a lower member to the housing 11 by screws.

Although the L-shaped housing 11 from which the wire W is pulled out downward is used in the above embodiment, there is no limitation to this. For example, an I-shaped (linear) housing from which the wire W is pulled out rearward may be used.

Although the inner conductive member 13 for connecting the wire W and the connection terminal 14 is composed of three members including the first, second and third conductive members 31, 32 and 33 in the above embodiment, there is no limitation to this. The number of components of an inner conductive member for connecting the wire W and the connection terminal 14 can be changed as appropriate.

The housing 11 and the inner conductive member 13, and the housing 11 and the connection terminal 14 may be facing each other via an air layer.

Although not particularly mentioned in the above embodiment, a high radiation portion may be similarly provided on another member if this member is arranged, for example, between the housing 11 and the inner conductive member 13 or between the housing 11 and the connection terminal 14.

In several implementation examples of the present disclosure, the high radiation portions 51 may be radiation rate improving films configured to increase radiation rates of base materials at least for infrared rays (e.g. near infrared rays, far infrared rays) having a predetermined wavelength by being held in close contact with the base material (e.g. synthetic resin) of the housing 11, the base material (e.g. conductive metal) of the shield shell 12, the base material (e.g. conductive metal) of the connection terminal 14 and the base material (e.g. conductive metal) of the inner conductive member 13.

In several implementation examples of the present disclosure, some or all of the plurality of high radiation portions 51 can be formed of materials same as or different from the respective base materials of the housing 11, the shield shell 12, the connection terminal 14 and the inner conductive member 13.

In several implementation examples of the present disclosure, the base material of the shield shell 12, the base material of the connection terminal 14 and the base material of the inner conductive member 13 may be formed of a first metal base material mainly containing a first metal element (e.g. aluminum), and the high radiation portions 51 may be plating films containing a second metal element (e.g. nickel or chromium) different from the first metal element or resin films and may contain pigments or colorants.

[Addendum 1] A shield connector according to one aspect of the present disclosure includes a housing, a shield shell for covering the housing from outside, a terminal to be accommodated into the housing and electrically connected to a mating device, and an inner conductor for electrically connecting the terminal and the wire, wherein high radiation portions made of a second material having at least a higher radiation rate than a first material constituting a core of the wire are provided on at least some of a surface of the housing, a surface of the shield shell, a surface of the terminal and a surface of the inner conductor.

LIST OF REFERENCE NUMERALS

10 shield connector
11 housing
11*a* surface
12 shield shell
12*a* inner surface
12*b* outer surface
12*c* part
13 inner conductive member (inner conductor)
13*a* surface
14 connection terminal (terminal)
14*a* surface
21 rear member
22 front member
23 cover member
24 first tube portion
24*a* opening
24*b* opening
25 second tube portion
31 first conductive member
31*a* barrel portion
31*b* terminal portion
32 second conductive member
33 third conductive member
41 lower member
42 upper member
51 high radiation portion
52 low radiation portion
C case
H heat source
N1 fixing screw
N2 fixing screw
N3 fixing screw
W wire
W1 core

What is claimed is:

1. A shielded connector, comprising:
a housing;
a shield shell for covering the housing from outside;
a terminal to be accommodated into the housing and electrically connected to a mating device; and
an inner conductor for electrically connecting the terminal and a wire,
wherein:
high radiation portions having at least a higher radiation rate than a core of the wire are provided on at least some of a surface of the housing, an inner surface of the shield shell, a surface of the terminal and a surface of the inner conductor, and
a part of the high radiation portion of the housing is facing each of the high radiation portion of the inner conductor and the high radiation portion of the terminal via an air layer and another part of the high radiation portion of the housing is facing the high radiation portion on the inner surface of the shield shell via an air layer so that heat of the inner conductor and the terminal is transferred to the housing and further dissipated from the shield shell.

2. The shielded connector of claim 1, wherein the shield shell includes a low radiation portion having a lower radiation rate than the high radiation portions on at least a part of an outer surface of the shield shell.

3. The shielded connector of claim 2, wherein the low radiation portion is provided at a position facing an external heat source on the outer surface of the shield shell.

* * * * *